July 15, 1924.

W. SADORUS

CORN POPPING MACHINE

Filed March 10, 1924   2 Sheets-Sheet 1

1,501,624

Inventor
Warren Sadorus

By   Ch. Parker
   Attorney

July 15, 1924.  1,501,624
W. SADORUS
CORN POPPING MACHINE
Filed March 10, 1924   2 Sheets-Sheet 2
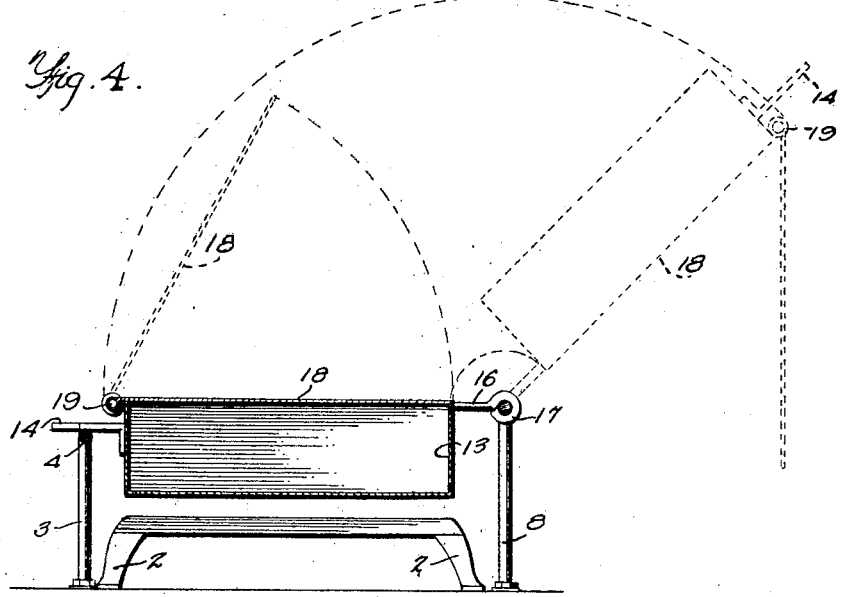
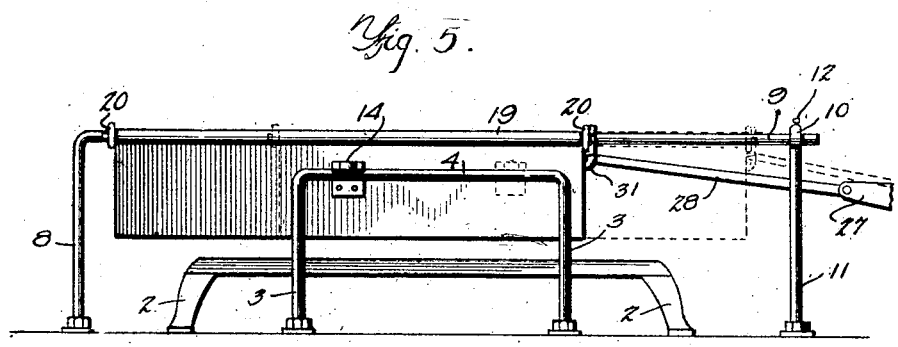
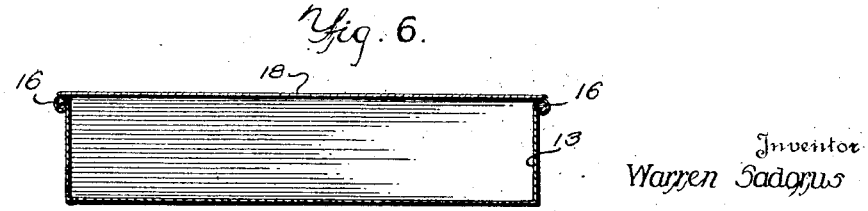
Inventor
Warren Sadorus
By
Attorney Patented July 15, 1924.

1,501,624

UNITED STATES PATENT OFFICE.

WARREN SADORUS, OF SADORUS, ILLINOIS.

CORN-POPPING MACHINE.

Application filed March 10, 1924. Serial No. 698,324.

*To all whom it may concern:*

Be it known that I, WARREN SADORUS, a citizen of the United States, residing at Sadorus, in the county of Champaign and State of Illinois, have invented certain new and useful Improvements in Corn-Popping Machines, of which the following is a specification.

This invention relates to corn popping machines.

An object of the invention is to provide means for reciprocating a pan or receptacle over an electric stove or other heater.

A further object is to provide means for adjusting the clearance between the pan and the stove.

A further object is the provision of a simplified drive mechanism which may be operated by a small electric motor.

In the accompanying drawings, I have shown one embodiment of the invention. In this showing:

Figure 4 is a transverse vertical sectional view showing, in dotted lines, the arrangement of the pan during the filling and emptying operations.

Figure 5 is a side elevation, and,

Figure 6 is a vertical longitudinal sectional view of the pan.

Figures 2, 3:
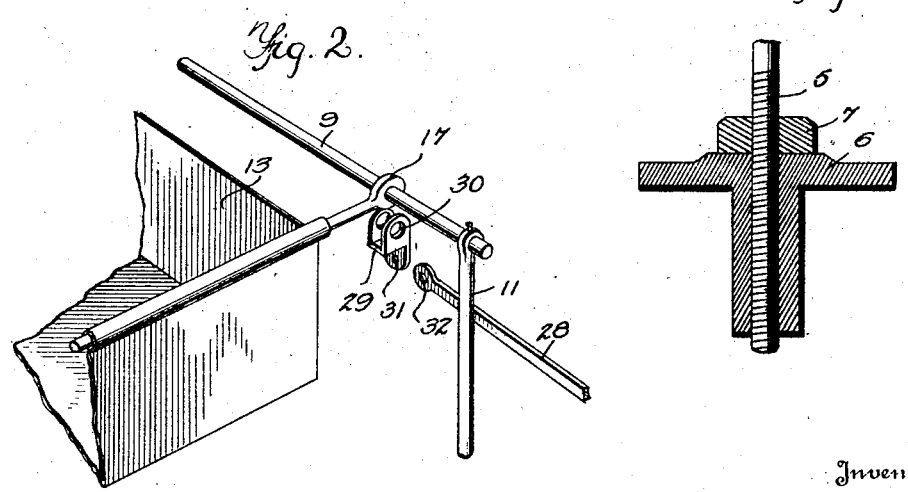
Figure 2 is a perspective view of a portion thereof on an enlarged scale showing the drive mechanism.
Figure 3 is a detail sectional view of one of the supporting members showing the adjusting means.

Referring to the drawings, the reference numeral 1 designates an electric stove of any suitable construction provided with supporting legs 2. In place of the electric stove shown, any other suitable heating apparatus may be employed. A substantially U-shaped supporting member is arranged on one side of the stove. As shown, the supporting member consists of legs 3 and a horizontal portion 4. Means are provided for adjusting the supporting member. As shown, (see Figure 3), the lower end of each of the legs is threaded, as at 5, and is adapted to be received in a bearing or bushing 6 mounted on the floor, table, or other suitable support. A lock nut 7 is arranged on the rod and the device is adjusted by varying the position of the lock nut on the leg. On the opposite side of the stove, there is provided a similar support consisting of an integral leg 8 and a horizontal member 9. The lower end of the leg 8 is provided with adjusting mechanism similar to the adjusting mechanism previously described. The end of the rod 9 is adapted to be received in an eye 10, formed on the upper end of a standard or supporting member 11. A set screw 12 is arranged in the eye to tighten the rod in position.

A pan is adapted to slide on the horizontal rods 4 and 9. As shown, I provide a pan 13 having an arm 14 extending over one side adapted to rest upon the horizontal supporting member 4. The end walls of the pan are provided with curled portions 15 adapted to receive rods 16. These rods are provided with eyes 17 adapted to fit over the rod 9. The pan is provided with a cover 18 mounted on a rod 19, and this rod is received in eyes 20 formed on the inner ends of the rod 16 to pivotally support the cover. The pan is adapted to be reciprocated over the stove by means of an electric motor. As shown, I provide a small motor 21, having a worm 22 arranged on its shaft and this worm meshes with a worm wheel 23 carried by a shaft 24. The shaft 24 is mounted in suitable bearings 25 carried by a supporting member 26. A crank 27 is formed on the end of the shaft and a link 28 is connected to this crank. A yoke 29 is arranged around one of the rods 16 and the arms of the yoke are provided with openings 30 for the reception of the rod 9. The yoke is provided with a depending ear 31 having an opening for the reception of a pin passing through an opening 32 in the connecting rod 28.

Figure 1:
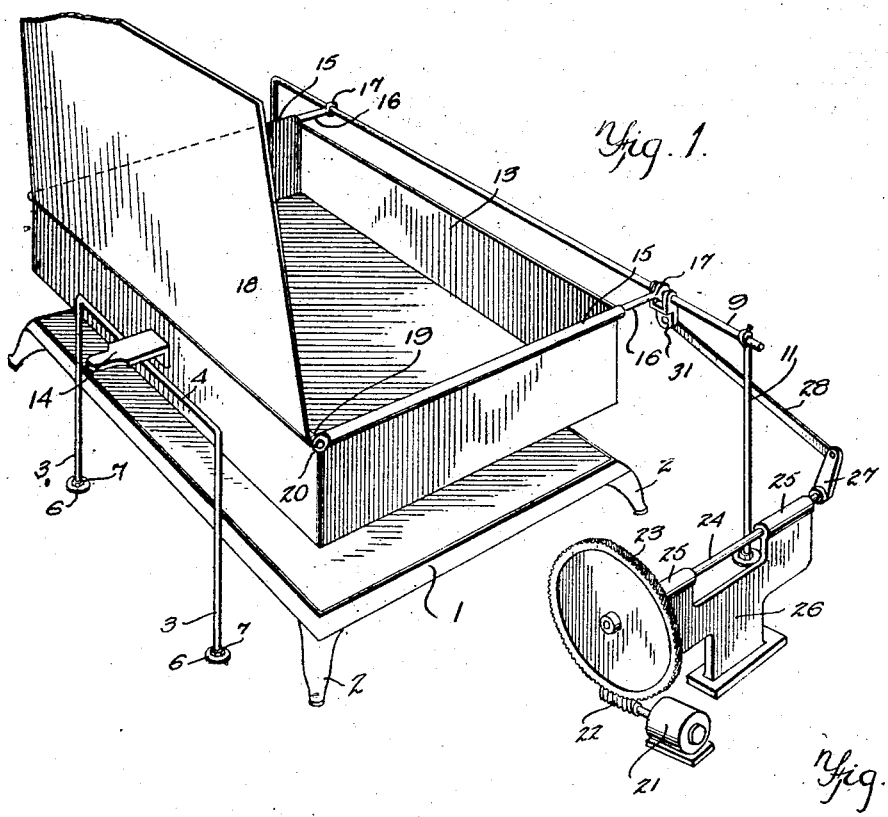
Figure 1 is a perspective view of the apparatus.

In operation, the legs 3 and 8 are adjusted and the standard 11 adjusted to raise or lower the horizontal supporting rods 4 and 9 and properly position the pan with respect to the stove. In assembling the apparatus, the rod 9 is passed through the eyes 17 and the openings 30 in the yoke 29 and the standard 11 then arranged adjacent the free end of the rod. The yoke is arranged on opposite sides of the eye 17 in order to furnish a positive drive for the pan in either direction. When the motor is started, the connecting rod causes the adjacent rod 16 to be alternately pushed and pulled and the opposite side of the pan is supported by a handle 14 riding on the horizontal supporting member 4. The pan is thus reciprocated while the corn is being popped. The cover 18 is pivotally mounted, permitting it to be raised to the position shown in Figure 1 of the drawings, for filling the pan. When the popping operation has been completed, the pan may be swung around the rod 9 as a pivot, as shown in dotted lines in Figure 4 of the drawings, and emptied. When swung in this manner, the cover opens by gravity and the contents of the pan may be dumped on to the table or into a suitable receptacle arranged to receive them.

It is to be understood that the form of the invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a pan, a supporting member arranged on each side of said pan, an arm projecting from one side of said pan and adapted to rest upon one of said supporting members, rods arranged at each end of said pan and projecting from the other side thereof, said rods pivotally connected with the other supporting member and adapted to slide thereon, and means for reciprocating said pan on said supporting members.

2. In a device of the character described, a pan, a vertically adjustable supporting member arranged on each side of said pan, an arm projecting from one side of said pan and adapted to rest upon one of said supporting members, rods arranged at each end of said pan and projecting from the other side thereof, said rods pivotally connected with the other supporting member and adapted to slide thereon, and means for reciprocating said pan on said supporting members.

3. In a device of the character described, a pan, a supporting member arranged on each side of said pan, an arm projecting from one side of said pan and adapted to rest upon one of said supporting members, rods secured to each end of said pan and projecting from the opposite side thereof, the ends of said rods being provided with eyes adapted to receive said supporting member, and means for reciprocating said pan on said supporting members.

4. In a device of the character described, a pan, a supporting member arranged on each side of said pan, an arm projecting from one side of said pan and adapted to rest upon one of said supporting members, rods secured to each end of said pan and projecting from the opposite side thereof, the ends of said rods being provided with eyes adapted to receive said supporting member, a yoke embracing the end of one of said rods, said yoke being provided with alined openings for the passage of said supporting member, and drive means connected to said yoke.

5. In a device of the character described, a pan, a supporting member arranged on each side of said pan, an arm projecting from one side of said pan and adapted to rest upon one of said supporting members, rods secured to each end of said pan and projecting from the opposite side thereof, the ends of said rods being provided with eyes adapted to receive said supporting member, a yoke embracing the end of one of said rods, said yoke being provided with alined openings for the passage of said supporting member, an ear formed on said yoke, and a drive member connected to said ear.

In testimony whereof I affix my signature in presence of two witnesses.

WARREN SADORUS.

Witnesses:
W. H. DE LONG,
HARRY B. ODELL.